United States Patent [19]

Marchessault et al.

[11] Patent Number: 5,451,456
[45] Date of Patent: Sep. 19, 1995

[54] LATEX OF POLY-β-HYDROXYALKANOATES FOR TREATING FIBER CONSTRUCTS AND COATING PAPER

[75] Inventors: Robert H. Marchessault, Montreal; Pierre F. LePoutre, Orono; Peter E. Wrist, Baie D'Urfe, all of Canada

[73] Assignee: Pulp and Paper Research Institute of Canada, Quebec, Canada

[21] Appl. No.: 916,990
[22] PCT Filed: Feb. 21, 1990
[86] PCT No.: PCT/CA90/00058
   § 371 Date: Aug. 18, 1992
   § 102(e) Date: Aug. 18, 1992
[87] PCT Pub. No.: WO91/13207
   PCT Pub. Date: Sep. 5, 1991
[51] Int. Cl.$^6$ .............. B32B 5/16; B32B 23/04; B05D 3/12; C08L 67/00
[52] U.S. Cl. .................. 428/327; 428/514; 428/522; 428/533; 428/536; 428/537.5; 428/207; 427/362; 427/375; 427/388.4; 427/391; 427/395; 523/124; 162/146; 162/168.7; 106/160
[58] Field of Search ............. 428/327, 533, 522, 514, 428/536, 537.5; 427/362, 375, 388.4, 391, 395; 523/7; 162/146, 168.7; 106/160; 435/41, 146

[56] References Cited

U.S. PATENT DOCUMENTS 3,036,959  5/1962  Baptist .
3,107,172  10/1963  Baptist et al. .

FOREIGN PATENT DOCUMENTS 0015123  9/1980  European Pat. Off. .
0204442  12/1986  European Pat. Off. .

OTHER PUBLICATIONS

Manufacturing Chemist, Oct. 1985, pp. 63 and 65.
Chemical Week, Aug. 28, 1985, pp. 55 and 57.

*Primary Examiner*—P. C. Sluby
*Attorney, Agent, or Firm*—Swabey Ogilvy Renault

[57] ABSTRACT

A latex comprises a colloidal suspension in water of essentially non-crystalline particles of a polymer or copolymer or β-hydroxyalkanoates, for example β-hydroxybutyrate and β-hydroxyvalerate; the latex may be employed to produce self-supporting filfms or papers which are biodegradable and also readily recyclable.

24 Claims, No Drawings

LATEX OF POLY-β-HYDROXYALKANOATES FOR TREATING FIBER CONSTRUCTS AND COATING PAPER

TECHNICAL FIELD

This invention relates to a method of preparing a coated or impregnated paper or other fibre construct, to a coated or impregnated paper or other fibre construct, to a latex for use in the preparation of paper or other fibre constructs and to films, and self supporting films.

BACKGROUND ART

More and more, paper is surface treated in order to improve its properties. In the manufacture of printing papers, an aqueous suspension of pigment particles and binder, similar to a latex house paint, is applied at high speeds typically up to 100 km/h with roll or blade coaters. The paper is then dried and calendered. The finished surface is very smooth, uniform and glossy and gives excellent print quality particularly in multicolour printing.

The binders currently used in pigmented coatings are soluble polymers such as starch or polyvinyl alcohol or latexes based on styrenebutadiene, polyvinyl acetate or acrylic monomers. The synthetic latex binders are not biodegradable. Starch is biodegradable but has poor binding efficiency and is water-sensitive, a problem in multicolour offset printing where water is applied at each station, as well as in water-based gravure or flexographic printing.

The market for pigmented coated papers is growing extremely fast, currently about 10–15% per year, and it may be predicted that even the lower grades such as newsprint will be coated one way or another in the near future.

Surface treatments and impregnations are applied for reasons other than that of improving print quality. The size-press, and its newer versions, are used to apply a number of chemicals that will change the surface and also the bulk properties of paper. Hydrophobicity, mechanical strength, grease resistance, release properties, friction, flammability, electrical conductivity are examples of properties that can be imparted to paper by such means.

In packaging grades, hydrophobicity, papers that are non-wetting, water fast and a property called "stiffness-when-wet" are requirements that are difficult to meet adequately. Usually, petroleum-based resins and waxes are used to obtain the effect, but it is difficult to reach high levels of hydrophobicity and wet-stiffness without imparting also a high level of permanency to the product.

The recycling of paper and paper fibers is increasingly demanded by an environmentally sensitive public as well as for economic reasons. Up to now, there has been a lack of sensitivity in the design of paper coating thermoplastics for ultimate recycling and currently coated paper is not readily recycled.

Synthetic latices are employed as binders in fibre constructs including paper and non-woven fabrics, and disposal of such fibre constructs also represents an environmental problem.

Self-supporting polymer films are used in a variety of applications, for example, water impermeable films in disposable diapers, and these films too, represent an environmental problem.

Self-supporting films which are biocompatible are also employed for controlled delivery of drugs in the body. Such films may be microporous with the drug being held within the micropores, or the film may form a capsule about the drug, and degrade slowly in the body to release the drug. It is important that the degradation products of such films be non-toxic in the body.

Thermoplastic polymers of bacterial origin are known which behave like polypropylene and related polyolefins, but which are biodegradable. These polymers form a family of poly-β-hydroxyalkanoates based mainly on β-hydroxyalkanoic acids containing 4 or 5 carbon atoms and are, more especially, isotactic crystalline polyesters of high molecular weight.

These poly-β-hydroxyalkanoates and in particular poly-β-hydroxy-butyrate (PHB) and (β-hydroxybutyrate-β-hydroxyvalerate) (PHB/V) copolymer are microbially produced in nature and can be synthesised on an industrial scale from a variety of bacteria, by fermentation technology. These polymers are in powder available commercially in a spray dried particle form.

DISCLOSURE OF THE INVENTION

This invention seeks to provide a latex for use in the preparation of a coated or impregnated paper which possesses the needed characteristics provided by conventionally employed binders, but which renders the paper biodegradable as well as more readily recyclable.

The invention also seeks to provide a biodegradable and more readily recyclable paper.

Still further the invention seeks to provide a method of preparing a coated or impregnated paper with a latex in accordance with the invention.

Still further the invention seeks to provide a latex for use in the preparation of fibre constructs, for example, non-woven fabrics.

Still further the invention seeks to provide a latex for use in the preparation of self-supporting biodegradable or recyclable films.

In accordance with one aspect of the invention there is provided a latex which comprises a colloidal suspension in water of essentially non-crystalline particles of a poly-β-hydroxyalkanoate polymer or copolymer.

In accordance with another aspect of the invention there is provided a method of preparing paper which comprises adding to a paper construct a latex of the invention and processing the construct to form a paper coated or impregnated with the polymer or copolymer.

In accordance with still another aspect of the invention there is provided a method of treating a fibre construct comprising applying to the fibre construct a latex of the invention and drying the thus treated fibre construct.

In accordance with yet another aspect of the invention there is provided a method of preparing self-supporting films from a latex of the invention.

In a particular embodiment of this latter aspect the polymer coated paper is exposed to solvent vapour to effect penetration of the polymer into the paper.

In still another aspect of the invention there is provided a paper having a surface coating of a polymer in accordance with the invention.

In yet another aspect of the invention there is provided a paper impregnated with a polymer in accordance with the invention.

In still another aspect of the invention there is provided a fibre construct containing a polymer or copolymer of a latex of the invention.

In yet another aspect of the invention there is provided a self-supporting film derived from a latex of the invention.

The poly-β-hydroxyalkanoate polymer or copolymer of the invention comprises monomer units of formula (I):

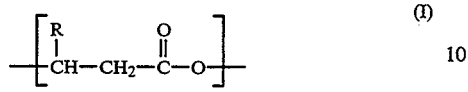

in which R is a straight or branched chain alkyl of 1 to 12 carbon atoms. The invention contemplates homopolymers in which all units of formula (I) have the same alkyl substituent R, as well as copolymers formed from different monomer units of formula (I).

The latex of the invention may contain pigments or colour formulations as well as additives selected from surface active agents, dispersion agents and rheological adjuvants as well as antibacterials.

The paper of the invention has the appearance and performance of currently available papers with the added advantage of biodegradability and recyclability by conditions employed in the paper industry, i.e., alkaline hydrolysis.

The polymers and copolymers of the latex are an intracellular energy source for most bacteria and thus will degrade in landfill environments to oligomers of the β-hydroxy acids and ultimately to carbon dioxide and water. This represents a significant advance for otherwise non-recyclable and wet-strength consumer paper products, fibre constructs and films. In secondary fibre recovery the polymers hydrolyse in alkaline media at a pH of 7.5 to 12, and the hydrolysis products disperse and re-emulsify without forming sticky deposits.

The recycling essentially occurs through the ease of hydrolysis of the poly-β-hydroxyalkanoates which may be achieved chemically or enzymatically. Alternatively the recycling may employ a mechanical removal relying on the crystalline character of the dried material.

MODES FOR CARRYING OUT THE INVENTION i) Poly-β-hydroxyalkanoates

The poly-β-hydroxyalkanoates are thermoplastic and have characteristics which depend on their composition. Melting point ($T_m$), glass transition temperature ($T_g$) and crystallization rate of butyrate/valerate copolymers decrease with increase in content of β-hydroxyvalerate units, the latter increase also has a plastifying and softening effect on the polymer as well as increasing the elongation at break and the toughness.

The native, polymer or copolymer is preferably in the form of virgin wet granules of the polymer or copolymer, by which is intended granules as produced in the fermentation and which have never been subjected to drying. These granules are essentially non-crystalline but the dried material is crystalline. In water these granules have a latex form similar to commercially available polystyrene and styrene-butadiene latices. The granules are white and generally produce a viscosity in water greater than that of their synthetic counterparts, for a given solids content.

The granules are polydisperse and typically range in diameter from 0.2 to 1.5 μm; scanning micrographs indicate that some granules are fused in pairs. Agglomeration treatments can be used to artificially increase the particle size.

An especially preferred class of polymers and copolymers within formula (I) comprises:

a) 0 to 100%, preferably 65 to 100%, more preferably 70 to 100% by weight of β-hydroxybutyrate units of formula (II):

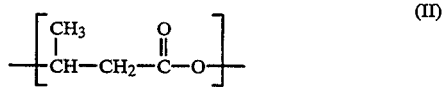

and b) 100 to 0%, preferably 35 to 0%, more preferably 30 to 0%, by weight, of β-hydroxyvalerate units of formula (III):

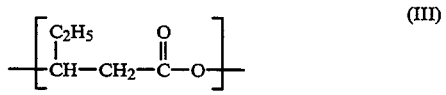

A preferred homopolymer is the poly-β-hydroxybutyrate homopolymer derived from monomer units of formula (II). a preferred copolymer is derived from β-hydroxybutyrate units of formula (II) and up to 31%, preferably up to 21%, by weight, of β-hydroxyvalerate units of formula (III).

The invention also contemplates latices based on such polymers and copolymers derived from crystalline particles, by regenerating the essentially non-crystalline granules.

ii) Manufacture of Latex

The poly-β-hydroxyalkanoates are synthesised by a variety of bacteria and thus may be produced industrially by application of standard fermentation techniques.

a) Fermentation

A wide range of microorganisms is capable of poly-β-hydroxybutyrate (PHB) production. Most bacteria that can accumulate PHBs also have the ability to produce some copolymers. So far poly-β-hydroxyalkanoate (PHA) copolymer production has been demonstrated in *Alcaligenes eutrophus, Bacillus megaterium,* a species of *Cyanobacteria, Alcaligenes latus, Pseudomonas pseudoflava, Pseudomonas cepacia* and other bacteria. It has been demonstrated that *Alcaligenes eutrophus* is only capable of synthesizing PHA whose monomers are $C_4$, $C_5$ or $C_6$, this is due to enzymatic specificity. *Pseudomonas oleovorans* and other fluorescent pseudomonads can produce PHAs with a much wider range of monomer chain length when specific alkanes or alkanoic acids are used as the substrate.

Batch PHB production is generally a 2-step process. The first stage involves the production of high protein biomass at an exponential rate. The maximum specific growth rate for *Alcaligenes eutrophus* is about 0.42 $h^{-1}$ in mineral salts medium. In the second stage, the cells produced in the first stage accumulate PHA intracellularly. Since the number of microorganisms remains constant, the rate of accumulation is linear. The onset of the second stage begins after the exhaustion of a limiting nutrient other than carbon, usually the nitrogen and/or phosphorus source.

High density fermentations are suitable. A final cell dry weight concentration of about 100 g $L^{-1}$ is desirable. For a final intracellular PHB concentration of about 70%, then 30 g $L^{-1}$ of high protein biomass should be produced in the first stage of the fermentation and 70 g L$^{-1}$ in the second stage. Since the quantities of both the carbon and nitrogen sources needed to produce such high concentrations are usually inhibitory to growth and production, either a fed-batch or a chemostat fermentation is used. With the exception of *A. latus*, most microorganisms will not accumulate high concentrations of PHB under chemostat conditions. Also, in a chemostat, expensive copolymer substrates such as propionic acid cannot be entirely directed towards polymer synthesis. In general a fed-batch fermentation is preferred.

The oxygen requirements for the first stage of fermentation are much higher than the second stage. For example *P. cepacia* growing on fructose in a mineral salts medium requires a maximum of about 10 mM h$^{-1}$ of oxygen per gram of cellular protein during the first stage but only about half as much during the PHB accumulation phase. For this reason, use of different fermentors for each stage may be appropriate.

The kind of PHA formed depends on the type of carbon source supplied and the ratio of their concentration during the PHA accumulation phase. For example, if cells of *A. eutrophus* are placed in nitrogen source free medium with glucose as the sole source of carbon, 100% of the PHA monomers will be HB. If pentanoic acid is used as the sole carbon source, up to 90 moles % of the PHA will be HV and 10 moles % HB. Addition of 4-hydroxybutyric acid results in its incorporation as a monomer as opposed to the usual 3-hydroxybutyric acid. Thus by controlled feeding of specified carbon sources, the desired copolymer composition can be obtained.

PHA molecular weight should suitably be as high as possible at the end of a fermentation as it may degrade during processing, especially at high temperatures. High concentrations of carbon sources such as methanol in the fermentor may result in lower molecular weight.

b) Separation of PHA from Biomass

During the initial stages of the PHA accumulation phase, the rate of production is linear. However, as the PHA concentration in the biomass reaches a critical level, it begins to slow down. For this reason, industrial PHA fermentations should be harvested when the biomass contains 60 to 80% PHA.

Two general approaches are taken to separate PHA from the rest of the bacterial biomass. One is to break the cells and then use a series of separation steps to isolate the PHA granules. The other is to use solvents to extract the PHA directly from intact cells.

The solvent extraction method usually involves the use of a chlorinated solvent such as chloroform, dichloroethane or 1,1,2-trichlorethane. Acetic anhydride and propylene or ethylene carbonate can also be used. In most cases the PHA is subsequently precipitated by addition of the solution to methanol.

Separation may also be achieved by differential digestion using sodium hypochlorite. This method is based on the fact that PHB is degraded less by aqueous hypochlorite than other biomass components. Generally the procedure consists of contacting the PHA-containing biomass with an aqueous hypochlorite solution containing 5% titratable chlorine. The residue may be purified by methods such as solvent washing, dialysis or recrystallization.

In the past the main problem with this method was its severe effect on the polymer molecular weight. Recently, however, methods for the optimization of hypochlorite digestion have been developed allowing the isolation of high molecular weight granules. Pretreatment of biomass with nonionic or cationic surfactants enhances this process.

Separation may also be achieved by enzymatic digestion in which an aqueous suspension of PHA-containing biomass is heat-shocked to between 100°–150° C. for a short period of time to denature protein, RNA and DNA and rupture the cell walls. The pH is held at between 6 and 8 to avoid any PHA degradation. Sequential treatments with enzymes such as proteases and phospholipase are used to dissolve unwanted biomass. This is followed by washing with anionic surfactants such as sodium dodecylsulphate with or without EDTA.

A gentle method to isolate native granules of PHA after cell lysis involves two phases formed by two selected water soluble polymers. When particles such as PHA granules from lysed cells are added to such a system, they tend to be distributed in one of the phases based on their surface energy. Such distributions generally occur quickly and the thermodynamic equilibrium can be simply represented by a phase diagram. They are characterized by an 85–99% water content, little difference in density between phases, low interfacial tension and relatively high viscosity. In contrast to the distribution of particles, separation of the two phases is usually slow. It can be, however, greatly increased by centrifugation.

One such system is a dextran 500 (5% w/w)-polyethylene glycol (3.5% w/w) system.

Sonication or ultrasound can also be used to break cell walls in a preliminary step of granule isolation. Usually lysozyme and EDTA are added to aid in the process. The granules can then be isolated by methods such as density gradient centrifugation and cesium chloride or glycerol.

c) Latex

The latex thus separated from the biomass is an aqueous colloidal dispersion in which the colloidal particles of the poly-$\beta$-hydroxyalkanoates are in their native, virgin wet state.

The latex has the form of a white smooth slurry of pleasant fruity odour. X-ray diffraction patterns reveal that the colloidal particles or granules after drying are of good crystallinity, however, in the native, virgin wet state the granules are essentially non-crystalline, by which is intended that the granules are not crystalline or exhibit only weak crystallinity. At temperatures of about 5° C. the dispersion is very fluid and easily foamed by shaking.

The latex is readily diluted with water and can be readily rinsed off a surface to which it is applied, in contrast to aqueous dispersions formed from the spray dried powder which leaves a residue.

The latex may be modified for use in the invention by the addition of pigments and also by the addition of a surface active agent, for example, soap or detergent, a dispersion agent to improve or enhance the spreadability, rheological adjuvants and anti-bacteriostatic agents.

In particular the latex more especially contains 10 to 50%, preferably 15 to 30%, more preferably 20 to 25%, by weight, of the poly-$\beta$-hydroxyalkanoate.

A typical latex of the invention may contain, in weight % based on dry solids:
latex solids—10 to 15 parts by weight
pigment—50 to 65 parts by weight surface active or dispersing agents up to 0.03% by weight of pigment rheological aids up to 0.03% by weight of pigment bacteriostatic agents up to 0.1% by weight of solids.

The latex solids in this formulation are to be understood to be the polymers and copolymers of formula (I); the pigment may be, for example, clay of titanium dioxide.

In latices which do not contain pigment, the surface active or dispersing agents and the rheological aids are typically present in an amount up to about 0.1%, by weight, of the solids content of the latex.

The latex may also contain synthetic latex polymers and copolymers, for example, styrenebutadiene, and water soluble polymers, for example, carboxymethyl cellulose and starch. These polymers and copolymers may, for example, comprise up to 10 parts by weight of the solids.

iii) Film Formation

A film can be made from the latex by casting a dilute solution of 15–25% w/w solids on an impervious surface and allowing the water to evaporate slowly at room temperature. Heating the air dry film in a drying oven at a temperature 30 degrees below $T_m$ causes moderate fusion. These films are white, opaque and have a microporous structure as shown by electron micrographs. The surface energy of these films has a high "polar" component.

Air dried or partially fused films can be hot pressed, suitably at 100°–140° C., and 1000–5000 psi, to produce flexible and translucent films of average to high crystallinity. They are weakly birefringent but non-spherulitic.

The hot fusion treating of HPB/V copolymer films containing 21%, by weight, β-hydroxyvalerate, produces films of increased total surface energy as compared with HPB films and provides water imperviousness.

Dense, transparent films are also formed by exposing air dried films to solvent or liquid vapour atmospheres, such as chloroform and other halogenated solvents, ethylene or propylene carbonate, acetic anhydride, dimethylformamide, ethylaceto acetate, triolein, acetic acid and alcohols. The films are smooth but not very flexible. They show x-ray crystallinity but are not birefringent.

These films are self-supporting and may be used as such or laminated to paper or other substrates.

Coated paper was made by treating base-stock, cardboard, or any other paper substrate with a color formulation containing from 20 to 100% PHB/HV latex, with HV content ranging from 0 to 100%. The coating can be applied onto the substrate with a metering rod, bird applicator, size press or the like. Once dry, either by air exposure, infra-red, induction, convection or microwave oven, the coated substrate was subjected to heat and/or pressure treatment, i.e. hot or cold press, calendering and the like. The resulting material is of comparable strength, gloss, brightness and overall performance to commercially available coated paper products.

Exposing a paper substrate coated with polymer or copolymer in accordance with the invention, to solvent vapor results in penetration of the coating into the substrate to produce impregnation of the substrate by the polymer or copolymer.

A "wet strength" composite material was made by placing a layer of partially fused PHB/HV latex film on top or/and bottom of a sheet of paper or board. The resulting product can be hot pressed or solvent treated using the same conditions mentioned above to produce a two or three ply paper laminate containing paper or board encased or covered with a transparent hydrophobic polymer layer.

Impregnated "wet strength" material was also made by dipping or spraying paper or board substrates with a mixture containing from 15 to 100% PHB/HV latex with an HV content ranging from 0 to 100%. Once dry, the material may be pressed, calendered or solvent treated to produce a sheet where the individual cellulose fibers are covered and reinforced with the fused polymer.

Impregnation may also be achieved employing standard paper making techniques by adding the latex to a paper-forming fibre suspension prior to paper formation and allowing the latex to adsorb on the fibres.

In this specification the expression "paper construct" is employed to identify paper and paper-forming fibre suspensions.

In order to disclose more clearly the nature of the present invention, the following examples illustrating the invention are given.

EXAMPLE 1

A few grams of 21% HV polymer latex was diluted to 20–30% w/w solids with distilled water. The resulting mixture was poured on a clean glass surface and allowed to air dry at room temperature overnight. A white, uniform coat or film with little or no strength was obtained. It was then placed in a convection oven set at 100° C. for a period of not less than 10 minutes. A partially fused film was obtained; such film was flexible and peelable from the casting substrate. The film looked as white and opaque as when air dried, peelability being the only new distinguishable characteristic.

EXAMPLE 2

An air dried or partially fused film as in Example 1 above was placed inside Mylar (Trade Mark) sheets and wrapped in aluminum foil. It was subsequently hot pressed in a polymer molding press set at 100° C., a pressure of 5000 psi was applied for about 1 minute. the resulting film was x-ray crystalline, uniformly birefringent but non-spherulitic. Complete fusion imparted transparency, toughness and more flexibility to the film. If stretched at room temperature, it shows appreciable necking and turns completely white and opaque. The film elongation at break on hand stretching is at most 30%. The crystallinity of these films does not seem to change in time.

EXAMPLE 3

An air dried film prepared as in Example 1 was placed inside a desiccator containing a small amount of chloroform. After a 24 hour period the film was allowed to air dry at room temperature. Chloroform vapour and the dry film combine to produce an extremely smooth and tough film. It was very transparent but not birefringent. The film showed x-ray crystallinity.

EXAMPLE 4

Small strips of basestock paper (40 g/m$^2$, 1:1 mechanical and chemical pulp) were coated with a latex suspension (20–25% w/w solids, 21% HV) using a set of metering rods. Once coated, the strips were hung and allowed to air dry at room temperature until further treatment. The coat imparted opacity and brightness to the paper substrate. Suitable binders could be added to the latex to increase adhesion of the coat to paper.

EXAMPLE 5

A coated strip of paper prepared as in Example 4 above was placed between Mylar (Trade Mark) strips and wrapped in aluminum foil. The wrapped coated paper was hot pressed at 100° C., at a pressure of 5000 psi for about 1 minute. The polymer coating fused and adhered strongly onto the paper. It was transparent and glossy, comparable to styrene-butadiene latex-coated basestock paper.

EXAMPLE 6

A coated strip of paper prepared as in Example 4 was placed inside a desiccator containing a small amount of chloroform. After a 24 hour period the strip was allowed to air dry at room temperature. The paper strip lost its opacity and it was impossible to detect with respect to sideness of the original coating application. The fused polymer coating migrated to the body of the paper, an impregnated paper product was obtained.

EXAMPLE 7

Hot pressed film strips prepared as in Example 2 were immersed in a cultured broth containing 100 ml of activated sludge (Water treatment plant Deux Montagnes). Mineral salts, microelement solution and glucose as the only carbon source in the nutrient feed were added to the culture at a rate of 0.60 ml/h. Temperature, pH and agitation rate were 24°±1° C., 7.0 pH units and 600 rpm. The air inflow was kept at a constant rate of 0.9 L/h. The polymer strips (50.0 mm×10.0 mm×1.0 mm), were held inside the broth on supports and fixed by stainless steel thread. Every four days for a period of 20 days a strip was extracted, washed with distilled water and methanol and dried overnight at room temperature. Finally, the dried strip was weighed to quantify the weight loss. There was a steady decrease in weight as a function of incubation time leading to a total loss of 83% loss in a period of 12 days.

EXAMPLE 8

A PHA coated piece of paper prepared and treated as in Example 5 was shredded and placed in an aqueous NaOH, pH 11.0 solution. The resulting mixture is treated in a fibre disintegration for a period of 30 minutes to several hours, depending on temperature which can range from room temperature to 60° C., then washed to neutrality. The fibres are subsequently formed and air dried to a suitable paper handsheet.

We claim:

1. A latex consisting essentially of an essentially cell free colloidal suspension in water of native, virgin wet, essentially non-crystalline particles of a β-hydroxyalkanoate polymer or copolymer composed of repeating units of formula (I):

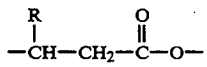

in which R is a straight or branched chain alkyl of 1 to 12 carbon atoms.

2. A latex according to claim 1, further comprising at least one additive selected from rheological adjuvants, surface active agents, dispensing agents and anti-bacteriostatic agents.

3. A latex according to claim 1, for use in surface treatment and impregnation of paper wherein said polymer or copolymer comprises:

a) 0–100%, by weight, of β-hydroxybutyrate units of formula (II):

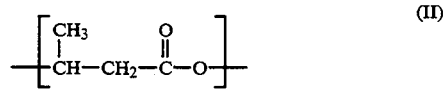

and b) 100–0%, by weight, of β-hydroxyvalerate units of formula (III):

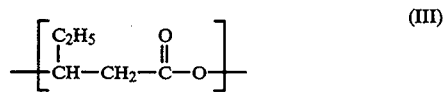

wherein at least one of a) and b) is greater than 0%, by weight.

4. A latex according to claim 3, wherein said polymer or copolymer is a homopolymer of said units of formula (II).

5. A latex according to claim 3, wherein said polymer or copolymer is a copolymer of said units of formulae (I) and (II).

6. A latex according to claim 5, wherein said copolymer comprises at least 70%, by weight, of units of formula (II) and not more than 30%, by weight, of units of formula (III).

7. A latex according to claim 3, 4, 5 or 6, further including at least one additive selected from rheological adjuvants, surface active agents, dispersing agents, and anti-bacteriostatic agents.

8. A latex, as defined in claim 1, 2, 3, 4, 5 or 6, having pigment dispersed therein.

9. A method of preparing paper which comprises adding to a paper construct a latex as defined in claim 1 or 2, and converting the paper construct with said latex to form a paper containing said polymer or copolymer.

10. A method of treating a fibre construct comprising applying to the fibre construct a latex, as defined in claim 1 or 2, and drying the resulting fibre construct.

11. A method according to claim 10, wherein said fibre construct is paper or a non-woven fabric.

12. A method of treating paper comprising:

coating paper with a latex comprising an essentially cell free Colloidal suspension in water of native, virgin wet particles of a poly-β-hydroxyalkanoate polymer or copolymer comprising:

a) 0–100%, by weight, of β-hydroxybutyrate units of formula:

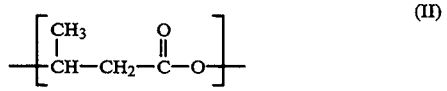

and b) 100–0%, by weight, of β-hydroxyvalerate units of formula (III):

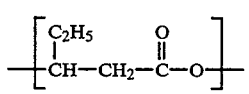 (III)

wherein at least one of a) or b) is greater than 0%, by weight, and drying the latex to form a coating of said polymer or copolymer on the paper.

13. A method according to claim 12, in which, following said drying, the coated paper is hot pressed at a temperature below the melting point of the polymer or copolymer, in the range 100°–140° C.

14. A method according to claim 12 or 14, wherein said polymer or copolymer is a homopolymer of said units of formula (II).

15. A method according to claim 12 or 14, wherein said polymer or copolymer is a copolymer of said units of formulae (II) and (III).

16. A method of forming a self-supporting film comprising:

casting a latex as defined in claim 1 or 2, on a support surface to form a wet film, drying said wet film to a dry film of the polymer or copolymer, heating said dry film below the melting temperature of the polymer or copolymer to produce fusion within the film, and removing the resulting film from said support surface.

17. A paper having an essentially cell free surface coating formed from native, virgin wet, essentially non-crystalline particles of a polymer or copolymer comprising:

a) 0–100%, by weight, of β-hydroxybutyrate units of formula (II):

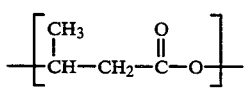 (II)

and b) 100–0%, by weight, of β-hydroxyvalerate units of formula (III):

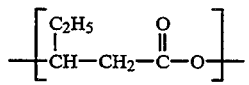 (III)

wherein at least one of a) or b) is greater than 0%, by weight.

18. A paper according to claim 17, wherein said polymer or copolymer is a homopolymer of said units of formula (II).

19. A paper according to claim 17, wherein said polymer or copolymer is a copolymer of said units of formulae (II) and (III).

20. A paper according to claim 19, wherein said copolymer comprises at least 70%, by weight, of units of formula (II), and not more than 30%, by weight, of units of formula (III).

21. A paper impregnated with an essentially cell free latex of native, virgin wet, essentially non-crystalline particles of a polymer or copolymer comprising:

a) 0–100%, by weight, of β-hydroxybutyrate units of formula (II):

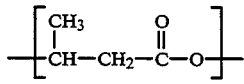 (II)

and b) 100–0%, by weight, of β-hydroxyvalerate units of formula (III):

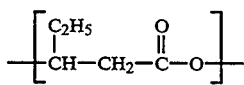 (III)

wherein at least one of a) or b) is greater than 0%, by weight.

22. A paper according to claim 21, wherein said polymer or copolymer is a homopolymer of said units of formula (II).

23. A paper according to claim 21, wherein said polymer or copolymer is a copolymer of said units of formulae (II) and (III).

24. A paper according to claim 17, wherein said copolymer comprises at least 70%, by weight, of units of formula (II) and not more than 30%, by weight, of units of formula (III).

* * * * *